US009483487B2

(12) United States Patent
Gupta et al.

(10) Patent No.: US 9,483,487 B2
(45) Date of Patent: Nov. 1, 2016

(54) ELIMINATING DUPLICATE DATA BY SHARING FILE SYSTEM EXTENTS

(71) Applicant: NetApp, Inc., Sunnyvale, CA (US)

(72) Inventors: Vivek Gupta, Bangalore (IN); Ameet Pyati, Bangalore (IN); Satish Singhal, Sunnyvale, CA (US); Pawan Saxena, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 95 days.

(21) Appl. No.: 14/456,914

(22) Filed: Aug. 11, 2014

(65) Prior Publication Data

US 2014/0372692 A1 Dec. 18, 2014

Related U.S. Application Data

(63) Continuation of application No. 12/955,770, filed on Nov. 29, 2010, now Pat. No. 8,825,969.

(60) Provisional application No. 61/265,316, filed on Nov. 30, 2009.

(51) Int. Cl.
*G06F 12/00* (2006.01)
*G06F 17/30* (2006.01)
*G06F 3/06* (2006.01)

(52) U.S. Cl.
CPC ....... *G06F 17/30156* (2013.01); *G06F 3/0608* (2013.01); *G06F 3/0619* (2013.01); *G06F 3/0641* (2013.01); *G06F 3/0686* (2013.01); *G06F 2003/0694* (2013.01)

(58) Field of Classification Search
None
See application file for complete search history.

(56) References Cited

U.S. PATENT DOCUMENTS

| 2007/0255758 | A1 | 11/2007 | Zheng et al. |
| 2009/0049260 | A1* | 2/2009 | Upadhyayula ........ G06F 3/0608 711/162 |
| 2009/0271402 | A1 | 10/2009 | Srinivasan et al. |
| 2011/0016095 | A1* | 1/2011 | Anglin ................ G06F 11/1453 707/692 |

OTHER PUBLICATIONS

"Final Office Action Mailed Jun. 20, 2013 U.S. Appl. No. 12/955,770, 9 pages."
"Final Office Action Mailed Mar. 28, 2014 U.S. Appl. No. 12/955,770, 5 pages."
"NetApp Drives Down Costs and Improves Efficiency for Data Center Backup and Recovery with Deduplication on NetApp VTL Systems—Sunnyvale, CA—Oct. 28, 2008—NetApp (NASDAQ: NTAP) NetApp Virtual Tape Library (VTL), 2 pages."
"Non-Final Office Action Mailed Jan. 15, 2013 in Co-Pending U.S. Appl. No. 12/955,770 of Gupta, V., et al., filed Nov. 29, 2010."
"Non-Final Office Action mailed Oct. 10, 2013 in Co-Pending U.S. Appl. No. 12/955,770 of Gupta, V., et al., filed Nov. 29, 2011. 8 pages."
"Notice of Allowance mailed Jul. 14, 2015 in Co-Pending U.S. Appl. No. 12/955,770 of Gupta, V., et al., filed Nov. 29, 2011. 5 pages."

* cited by examiner

Primary Examiner — Daniel Tsui
(74) Attorney, Agent, or Firm — Nixon Peabody LLP; Khaled Shami

(57) ABSTRACT

A hardware and/or software facility to enable emulated storage devices to share data stored on physical storage resources of a storage system. The facility may be implemented on a virtual tape library (VTL) system configured to back up data sets that have a high level of redundancy on multiple virtual tapes. The facility organizes all or a portion of the physical storage resources according to a common store data layout. By enabling emulated storage devices to share data stored on physical storage resources, the facility enables deduplication across the emulated storage devices irrespective of the emulated storage device to which the data is or was originally written, thereby eliminating duplicate data on the physical storage resources and improving the storage consumption of the emulated storage devices on the physical storage resources.

15 Claims, 11 Drawing Sheets

FIG. 1A
(Prior Art)

| DATA SET ID | VIRTUAL TAPE ID | SIZE (BYTES) | COMMON STORE EXTENTS |
|---|---|---|---|
| 1 | 3 | 9437184 | 750; 755 |
| 2 | 2 | 12582912 | 750; 755; 760 |
| ⋮ | ⋮ | ⋮ | ⋮ |
| N | ⋮ | ⋮ | ⋮ |

515a

600a — row 1
600b — row 2
600n — row N

| EXTENT ID | CSU ID | OFFSET (RCU) | SIZE (BYTES) | DEDUPED | FINGERPRINT |
|---|---|---|---|---|---|
| 750 | 732 | 1 | 5242880 | 1 | 66366 |
| 755 | 734 | 33 | 4194304 | 1 | 45645 |
| 760 | 737 | 1 | 3145728 | 0 | 94873 |
| ⋮ | ⋮ | ⋮ | ⋮ | ⋮ | ⋮ |
| X | ⋮ | ⋮ | ⋮ | ⋮ | ⋮ |

| DATA SET ID (601) | VIRTUAL TAPE ID (602) | SIZE (BYTES) (603) | COMMON STORE EXTENTS (604) |
|---|---|---|---|
| 1 | 3 | 9437184 | 750; 755 |
| 2 | 2 | 12582912 | 750; 755; 760 |
| ⋮ | ⋮ | ⋮ | ⋮ |
| N | ⋮ | ⋮ | ⋮ |
| M | 4 | 10485760 | 755; 790; 760 |

- 600a: row 1
- 600b: row 2
- 600n: row N
- 600m: row M

520b

| EXTENT ID (606) | CSU ID (607) | OFFSET (RCU) (608) | SIZE (BYTES) (609) | DEDUPED (610) | FINGERPRINT (611) |
|---|---|---|---|---|---|
| 750 | 732 | 1 | 5242880 | 1 | 66366 |
| 755 | 734 | 33 | 4194304 | 1 | 45645 |
| 760 | 737 | 1 | 3145728 | 0 | 94873 |
| ⋮ | ⋮ | ⋮ | ⋮ | ⋮ | ⋮ |
| X | ⋮ | ⋮ | ⋮ | ⋮ | ⋮ |
| 790 | 736 | 1 | 3145728 | 0 | 85431 |

ELIMINATING DUPLICATE DATA BY SHARING FILE SYSTEM EXTENTS

CROSS REFERENCE TO RELATED APPLICATIONS

This application is a continuation of U.S. Nonprovisional patent application Ser. No. 12/955,770, entitled "ELIMINATING DUPLICATE DATA BY SHARING FILE SYSTEM EXTENTS," and filed on Nov. 29, 2010, which claims the benefit of U.S. Provisional Patent Application No. 61/265,316, entitled "ELIMINATING DUPLICATE DATA BY SHARING FILE SYSTEM EXTENTS," and filed on Nov. 30, 2009, both of which are incorporated herein by reference in their entirety.

FIELD OF INVENTION

The present invention relates generally to data storage and, more specifically, to a data layout that enables virtual storage devices to share data stored on physical storage resources.

BACKGROUND

Data storage is a central part of many industries that operate in archival and compliance application environments, such as banks, government facilities/contractors, securities brokerages, and so on. In many of these environments, it is necessary to store data (e.g., electronic-mail messages, financial documents, transaction records, etc.) for long periods of time. Typically, data backup operations are performed to ensure the protection and restoration of such data in the event of a storage server failure.

One form of long term archival storage is the storage of data on physical tape media. A noted disadvantage of physical tape media is the slow data access rate and the added requirements for managing a large number of physical tapes. In response to these noted disadvantages, some storage system vendors provide virtual tape library (VTL) systems that emulate physical tape storage devices. When a storage server writes data (e.g., a backup file) to a virtual tape of a VTL system, the VTL system typically stores the data on a designated region of one or more disks that correspond to the virtual tape specified in the write command received from the storage server. Typically, space is allocated on the disks in large contiguous sections referred to as block extents, each block extent includes multiple contiguous data blocks. As each block extent of the virtual tape is filled, the VTL system selects a disk region to which to assign the next block extent. In conventional VTL systems, each block extent is fully and exclusively owned by the virtual tape to which it is allocated.

Objects in the VTL system called data maps are used to track the block extents that make up each virtual tape. FIG. 1A illustrates an example of a data map of a conventional VTL system comprising four virtual tapes. In the illustrated embodiment, the data map 100*a* includes data blocks 101-Z. To facilitate description, empty data blocks represent unused storage space, while data blocks having a fill pattern represent used storage space. The pattern of each data block represents the contents of the data block. Data blocks having the same pattern are duplicate data blocks (e.g., data blocks 104, 125, 136, 145, 156, 157, and 176 are duplicate data blocks). Each of the used data blocks has been written to a designated region on disk that corresponds to one of the virtual tapes. To facilitate description, each used data block is labeled to identify the virtual tape to which the data block was written. For example, data blocks 101-106, 142-144, 156, and 182-185 have been written to regions on disk that has been allocated to virtual tape 1 (e.g., "TAPE 1").

In typical VTL environments, a storage server performs a backup operation of the storage server's file system (or another data store) to the VTL system. These backups often result in the storage of duplicate data, thereby causing inefficient consumption of storage space on the VTL system. Data map 100*a* illustrates such inefficient consumption of storage space on a conventional VTL system (i.e., there are 48 used data blocks yet only 8 unique fill patterns).

A technique commonly referred to as "deduplication" may be used to reduce the amount of duplicate data written to disk regions allocated to a virtual tape. Conventional deduplication techniques involve detecting duplicate data blocks by computing a hash value ("fingerprint") of each new data block that is written to a virtual tape, and then comparing the computed fingerprint to fingerprints of data blocks previously stored on the same virtual tape. When a fingerprint is identical to that of a previously stored data block, the deduplication process determines that there is a high degree of probability that the new data block is identical to the previously stored data block. To verify that the data blocks are identical, the contents of the data blocks with identical fingerprints are compared. If the contents of the data blocks are identical, the new duplicate data block is replaced with a reference to the previously stored data block, thereby reducing storage consumption of the virtual tape on the VTL system.

Importantly, because each data block is fully and exclusively owned by the virtual tape to which it was written, deduplication in a conventional VTL system can be performed only on a per tape basis. That is, only duplicate data blocks written to the disk regions corresponding to the same virtual tape can be deduplicated. As a result, deduplication does not eliminate duplicate data blocks written to disk regions allocated to different virtual tapes.

Figure 1A:
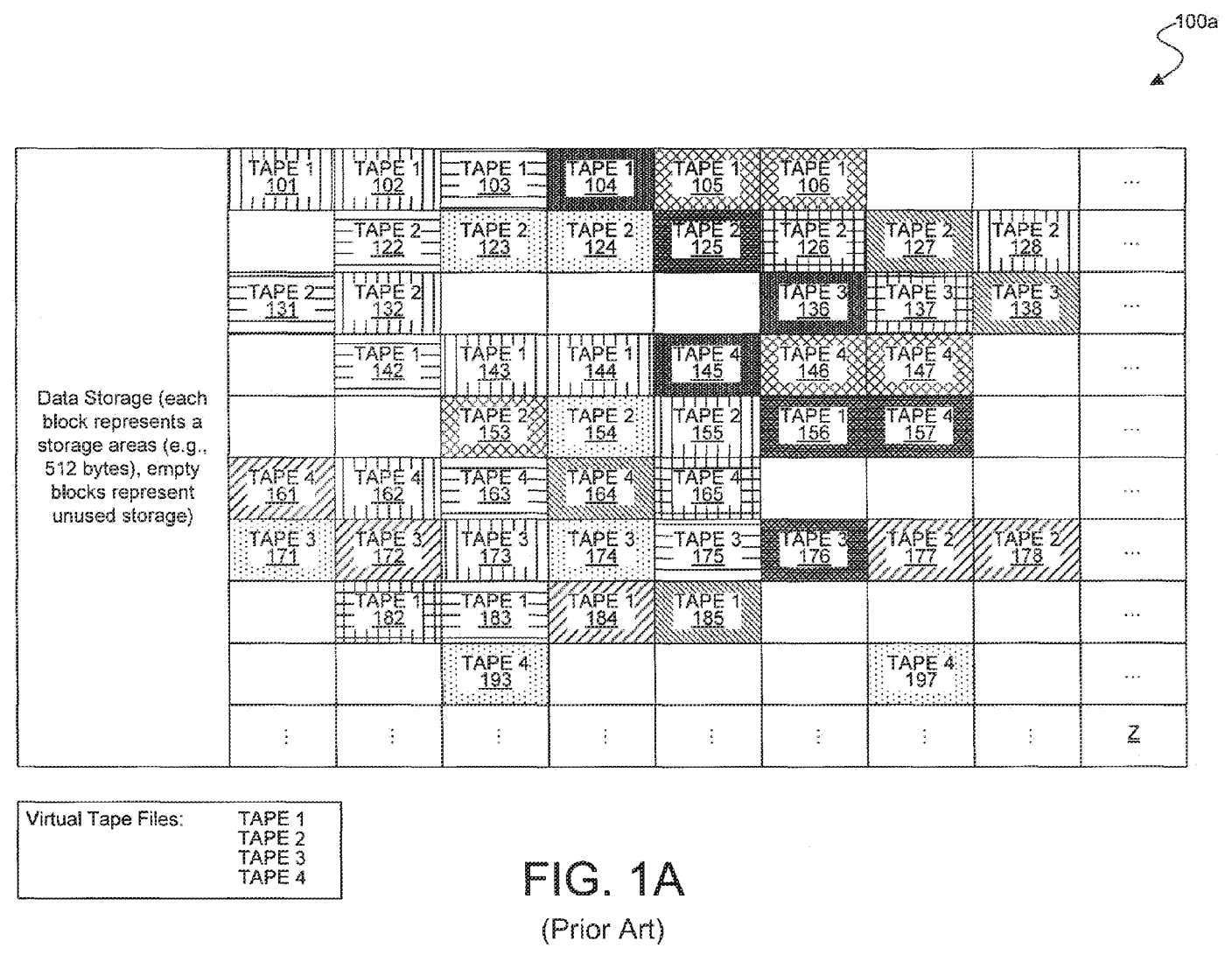

FIG. 1B illustrates a data map 100*b* corresponding to the data map 100*a* illustrated in FIG. 1A of a conventional VTL system after a deduplication technique is performed. As illustrated in FIG. 1B, although the duplicate data blocks written to disk regions allocated to the same virtual tape have been consolidated into a single data block, deduplication does not eliminate duplicate data blocks written to disk regions allocated to different virtual tapes (i.e., there are 8 unique fill patterns, yet 30 used data blocks remain). As a result, despite deduplication techniques, conventional VTL systems inefficiently consume storage space.

SUMMARY

The technology introduced herein provides a data storage layout that enables emulated storage devices to share data stored on physical storage resources. The technology may be implemented on a virtual tape library (VTL) system configured to back up data sets that have a high level of redundancy on multiple virtual tapes. By enabling emulated storage devices to share data stored on physical storage resources, the technology enables deduplication across the emulated storage devices irrespective of the emulated storage device to which the data is or was originally written, thereby eliminating duplicate data on the physical storage resources and improving the storage consumption of the emulated storage devices on the physical storage resources.

BRIEF DESCRIPTION OF THE DRAWINGS

One or more embodiments of the facility are illustrated by way of example and not limitation in the figures of the accompanying drawings, in which like references indicate similar elements and in which:

FIG. 1A illustrates an example of a data map of a conventional virtual tape library (VTL) system before deduplication.

FIGS. 6A and 6B show an example descriptor log and an example extent index at a first and at a second point in time.

DETAILED DESCRIPTION

Figure 1B:
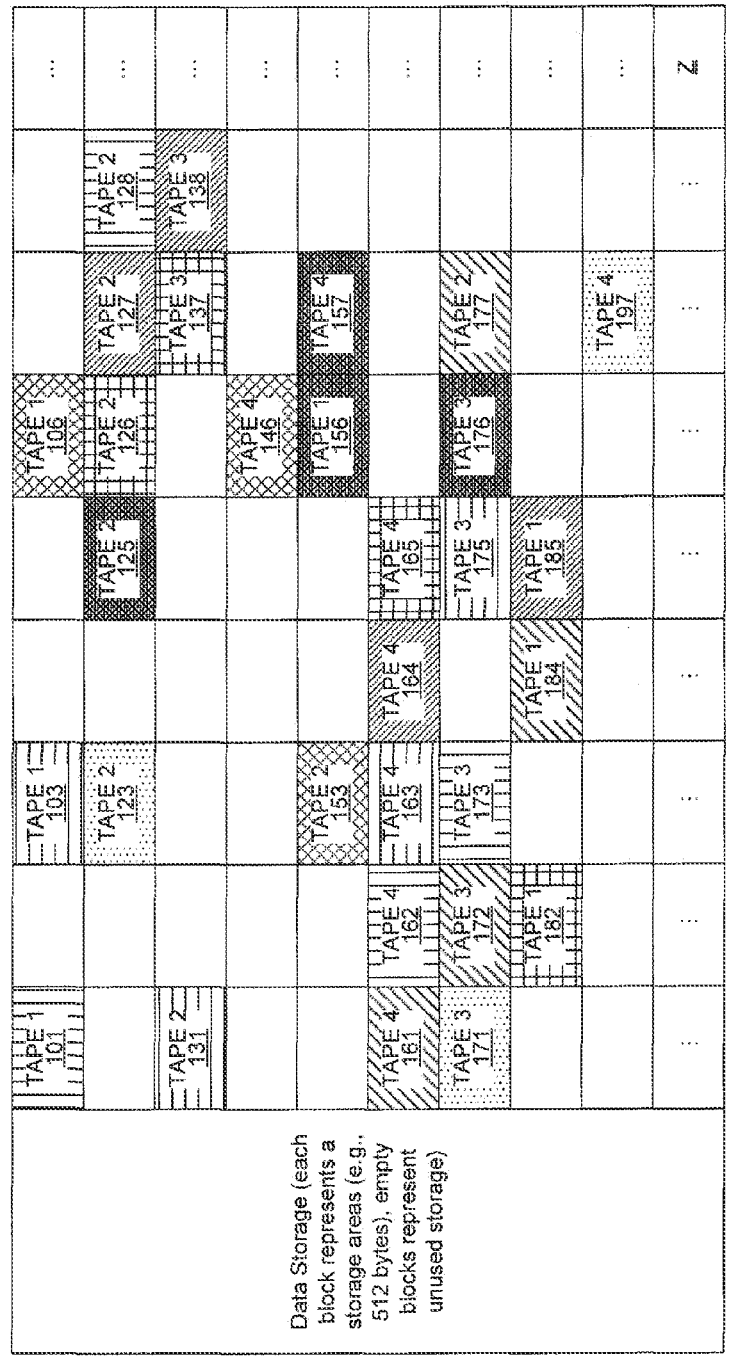
FIG. 1B illustrates an example of a data map of the conventional VTL system after deduplication.

The technology introduced herein can be a hardware facility, or a combination of hardware and software, that enables emulated storage devices to share data stored on physical storage resources of a storage system. As used herein, the term "storage resource" is used to refer to any computer-readable storage medium including volatile, non-volatile, removable, and non-removable media, or any combination of such media devices that are capable of storing information such as computer-readable instructions, data structures, program modules, or other data. In some embodiments, the facility is implemented on a virtual tape library (VTL) system configured to back up data sets that have a high level of redundancy on multiple virtual tapes. The facility introduced herein enables data stored on physical storage resources to be shared (referenced) by multiple virtual tapes of the VTL system irrespective of the virtual tape to which data was originally written. By enabling emulated storage devices to share data stored on physical storage resources, such as virtual tapes of a VTL system, the facility enables deduplication across the emulated storage devices, thereby eliminating duplicate data stored, or to be stored, on the physical storage resources.

In some embodiments, the facility organizes physical storage resources of a VTL system according to a common store data layout. Physical storage resources organized according to the common store data layout may be shared by emulated storage devices. As used herein, the term "common" is used to refer to shared storage. All or a portion of the storage resources may be organized according to the common store data layout, which is a structuring of data and metadata on the storage resources that both permits reading/writing of data and enables virtual tapes to share stored data. Storage resources or portions thereof organized according to the common store data layout are not allocated to, or exclusively owned by, any virtual tape of the VTL system.

Under the common store data layout, the storage resources are represented as a number of common store units (CSUs) that may be allocated to, and shared between, virtual tapes of the VTL system. A CSU comprises a fixed or variable number of contiguous data blocks (e.g., 256 contiguous 512 byte blocks of data). CSUs can comprise compressed and/or uncompressed data. For example, a CSU can represent 3 megabytes of data compressed into 128 kilobytes. A CSU can be shared (referenced) in whole or in part by different virtual tapes of the VTL system. In some embodiments, each CSU includes a header, one or more record compression units (RCUs) of compressed data, and boundary information mapping the beginning of each RCU to an offset in compressed storage space that may be read and uncompressed. An RCU may be split between two CSUs. That is, a portion of an RCU may be included in one CSU, while another portion of the same RCU is included in another CSU. In some embodiments, each RCU comprises 64 kilobytes of uncompressed data. Thus, if a CSU represents 3 megabytes of uncompressed data compressed into 128 kilobytes, then the CSU can hold up to 48 RCUs. It is noted that the facility may operate on data of varying sizes. As such, references herein to particular CSU or RCU sizes should not be taken as restrictive.

Each data set (e.g. a backup file) written to a virtual tape is assigned a descriptor entry within a mapping data structure. A descriptor entry of a data set is a metadata container that includes various information about the data set, while the actual data of the data set is contained in one or more "common store extents" (each comprising a section of the data set) allocated on storage resources irrespective of the virtual tape to which the data set was written. For example, a descriptor entry of a data set may identify the virtual tape to which the data set was written, the uncompressed length of the data set, whether the data is shared (deduped), last modified time/date, the common store extents that comprise the data set, the order of the identified common store extents (i.e., the logical position of each section of data within the data set), and so on.

A common store extent represents a physical location at which data is stored on physical storage resources. Typically, a data set spans multiple common store extents, and each common store extent spans one or more contiguous CSUs. A common store extent may be referenced, for example, by an offset in a CSU (e.g., an address corresponding to a RCU of the CSU in which the extent begins), an uncompressed length of the extent, and/or the number of CSUs included in the extent. The common store extents of a data set may or may not be contiguous on the storage resource.

The facility introduced herein enables data stored on physical storage resources to be shared (referenced) by multiple virtual tapes of the VTL system irrespective of the virtual tape to which the data set was originally written. For example, a common store extent identifying a section of a first data set written to a virtual tape may be represented in descriptor entries of other data sets written to other virtual tapes. That is, if another data set written to another virtual tape and includes the same section of data, then the descriptor entry of the other data set may identify the same common store extent identified in the descriptor entry of the first data set.

As noted above, each data set written to a virtual tape of the VTL system may include significant amounts of duplicated data, i.e., data that remains common among two or more data sets (e.g., backups) of a storage server and/or redundant data between data sets of different storage servers. In some embodiments, the facility introduced herein implements a deduplication technique to eliminate duplicate data stored, or to be stored, on the storage resources of the VTL system. For example, the facility may implement a sampling based deduplication technique, such as the technique described in commonly-owned, co-pending U.S. patent application Ser. No. 11/414,600 of L. Zheng et al., filed on Apr. 28, 2006 and titled "SYSTEM AND METHOD FOR SAMPLING BASED ELIMINATION OF DUPLICATE DATA," which is herein incorporated by reference. It will be appreciated by those skilled in the art that other suitable deduplication techniques may be implemented by the facility to eliminate duplicate data. By enabling virtual tapes of a VTL system to share the physical storage resources of the VTL system, the facility reduces duplicate data irrespective of the virtual tape to which the data is written or was originally written, thereby improving the efficiency of the use of the physical storage resources.

Figure 2:
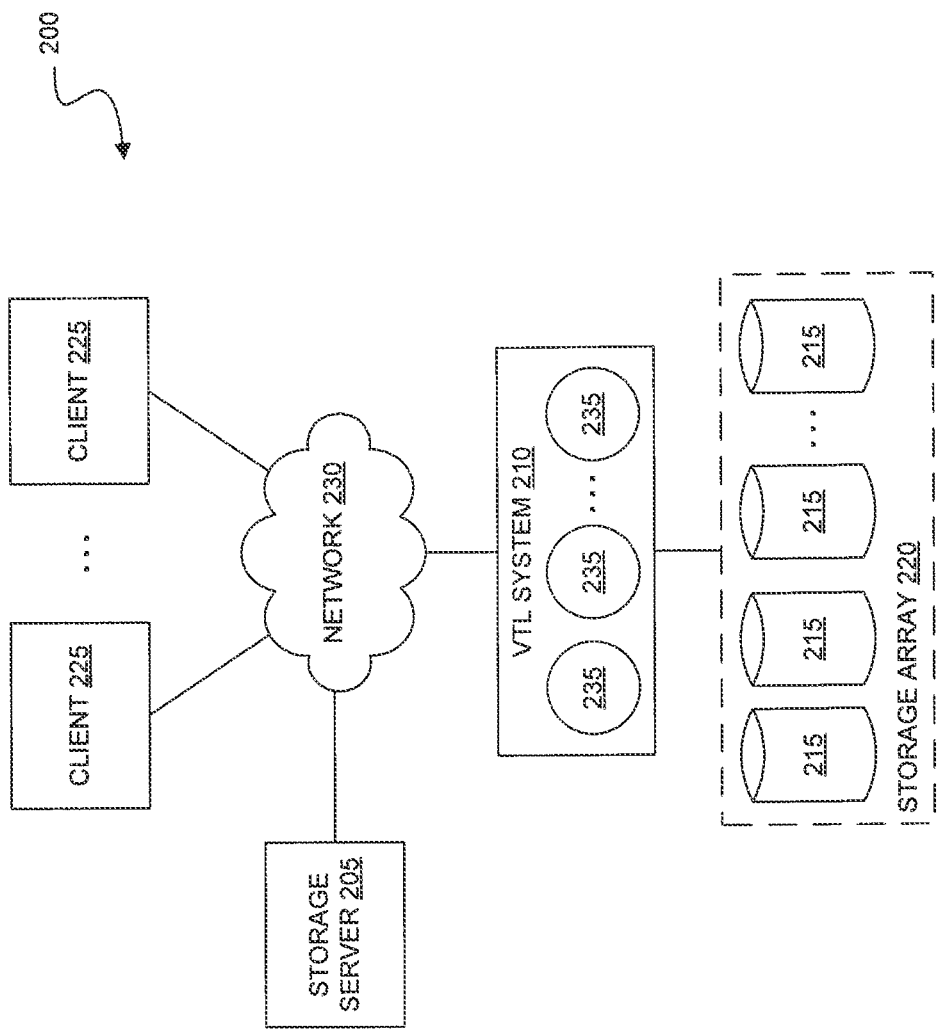
FIG. 2 is a block diagram of a storage server environment.

Before considering the facility introduced herein in greater detail, it is useful to consider an environment in which the facility can be implemented. FIG. 2 is a block diagram of a storage system environment 200 in which the facility may be implemented. The storage system environment 200 includes a storage server 205 that is connected to a virtual tape library (VTL) system 210, which is connected to one or more storage resources 215 organized as a storage array 220, and to a number of clients 225 through a network 230. The network 230 may be embodied, for example, as a Fibre Channel (FC) network, an Ethernet network, a combination of these, or the like. For example, the clients 225 may be connected to the storage server 205 through an Ethernet network, while the VTL system 210 is connected to the storage server 205 through a FC network.

The storage server 205 may be implemented in accordance with a variety of storage architectures including, but not limited to, a network attached storage (NAS) system, a storage area network (SAN), a multi-protocol storage system, or a disk assembly directly attached to a client 225 or host computer (referred to as a direct attached storage (DAS)), for example. In operation, the storage server 205 services various transaction requests (e.g., read, write, etc.) from the clients 225. Each client 225 may be a general-purpose computer (e.g., a personal computer, workstation, server, etc.) configured to execute applications and interact with the storage server 205 in accordance with a client/server model of information delivery. That is, a client 225 may request the services of the storage server 205, and the storage server 205 may return the results of the services requested by the client 205, by exchanging data packets over the network 230. The clients may use file-based access protocols, such as the Common Internet File System (CIFS) protocol or Network File System (NFS) protocol, over TCP/IP when accessing information contained in data containers, such as files and directories. Alternatively, the client may use block-based access protocols, such as the Small Computer Systems Interface (SCSI) protocol encapsulated over TCP (iSCSI) and SCSI encapsulated over Fibre Channel (FCP), when accessing information contained in data containers, such as blocks. Details regarding storage servers and client computers are known and well documented, and thus need not be described here in order to convey an understanding of the operation of the facility.

In the illustrated embodiment, the VTL system 210 appears to the storage server 205 as a remote tape drive; thus, the storage server 205 may perform a conventional tape backup operation to the VTL system 210 by using conventional tape backup software and protocols. For example, a backup operation is performed by copying the file system and/or other data sets of the storage server 205 to a virtual tape 235 of the VTL system 210. Data that is written to a virtual tape 235 is stored on the storage resources 215 of the VTL system 210. The storage resources 215 may be, for example, magnetic disks, optical disks such as CD-ROM or DVD based storage, magneto-optical (MO) storage, or any other type of storage devices suitable for storing large quantities of data. The storage resource 215 of the storage array 220 may be organized as a Redundant Array of Inexpensive Disks (RAID), in which case the VTL system 210 accesses the storage array 220 using one or more well-known RAID protocols.

In some embodiments, the facility introduced herein is implemented on the VTL system 210. That is, a common store data layout may be implemented on the VTL system 210 to enable one or more of the storage resources 215 to be allocated to, and shared between, the virtual tapes 235 of the VTL system 210. By providing a shared storage space, the facility enables data written to a virtual tape 235 to be shared (deduplicated) across multiple virtual tapes 235, thereby improving the efficiency of the use of the storage resources 215. The facility can alternatively be implemented by a computer system other than the VTL system 210. For example, the facility can be adapted for use in other types of storage environments that provide access to emulated storage devices (e.g., in a storage server such as storage server 205).

In some embodiments, the VTL system 210 or another device implements a deduplication technique to reduce duplicate data stored, or to be stored, on the storage resources 215. For example, prior to storing a received data set, the VTL system 210 may determine whether the received data set contains duplicate data (i.e., whether one or more sections of the received data set are already stored on the storage resources 215). In some embodiments, duplicate data is removed from the data set and replaced with a storage indicator that identifies the previously stored data (e.g., a reference to the corresponding common store extent, CSU, RCU, etc.). In some embodiments, duplicate data is removed from the received data set and the common store extent that corresponds to the previously stored data is added to the descriptor entry of the received data set. By enabling virtual tapes 235 of the VTL system 210 to share the storage resources 215 and by implementing a deduplication technique across the virtual tapes 235, the facility removes duplicate data irrespective of the virtual tape 235 to which the data is written or was originally written.

While various embodiments are described in terms of the environment described above, those skilled in the art will appreciate that the technology may be implemented in a variety of other environments including a single, monolithic computer system, as well as various other combinations of computer systems or similar devices connected in various ways. For example, in some embodiments, the VTL system 210 and/or the storage server 205 has a distributed architecture, even though it is not illustrated as such in FIG. 1. It is noted that the number of clients, servers, VTL systems, virtual tapes, storage arrays, and/or storage resources is not limited to the number or ratio illustrated in FIG. 1. Moreover, those skilled in the art will appreciate that the facility may include other types of computers and/or devices not specifically illustrated.

Figure 3:
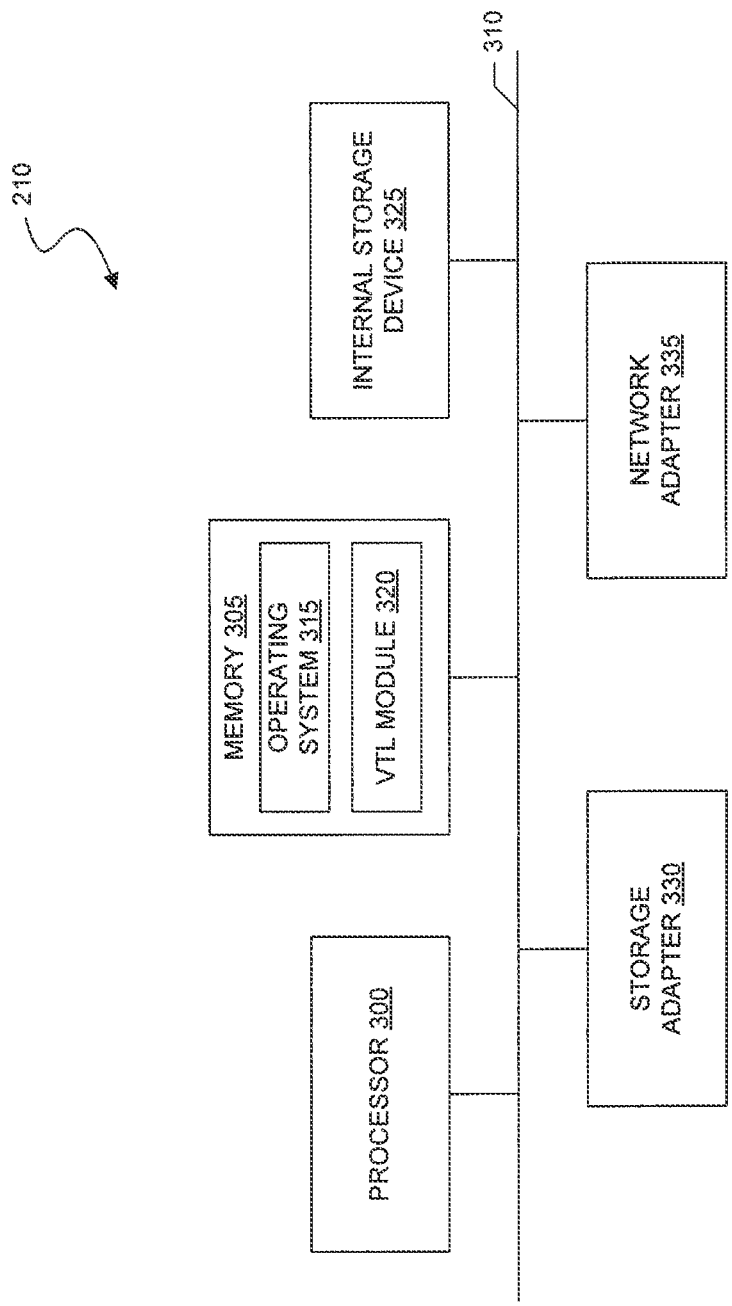
FIG. 3 is a block diagram of a VTL system.

FIG. 3 is a block diagram of a Virtual Tape Library (VTL) system 210. Certain well-known structures and functions which are not germane to this description have not been shown or described. The VTL system 210 includes one or more processors 300 and memory 305 coupled to an interconnect system 310. The interconnect system 310 shown in FIG. 3 is an abstraction that represents any one or more separate physical buses and/or point-to-point connections, connected by appropriate bridges, adapters and/or controllers. The interconnect system 310 may include, for example, a system bus, a form of Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 300 is the central processing unit ("CPU") of the VTL system 210 and, thus, controls its overall operation. In some embodiments, the processor 300 accomplishes this by executing software stored in memory 305. In some embodiments, the VTL system 210 includes a processor 300 having two or more independent cores in a package composed of a single integrated circuit (referred to as a "die"), one or more dies packaged together, multiple packages, and so on. In some embodiments, the VTL system 210 includes a hyper-threaded processor that, despite having only a single core, is capable of performing as a multi-core processor. A processor 300 may be, or may include, one or more programmable general-purpose or special-purpose microprocessors, digital signal processors ("DSPs") programmable controllers, application specific integrated circuits ("ASICs"), programmable logic devices ("PLDs"), or the like, or a combination of such devices.

Memory 305 includes the main memory of the VTL system 210. Memory 305 includes any form of volatile, nonvolatile, removable, and non-removable computer-readable storage media, or any combination of such media devices that are capable of storing information such as computer-readable instructions, data structures, program modules, or other data. Memory 305 stores (among other things) a storage operating system 315 and a VTL module 320 that comprises computer-executable instructions to configure the processor 300 to execute VTL functionality. It is noted that the facility does not depend on the type of storage operating system 315 implemented by the VTL system 210. In some embodiments, the storage operating system 315 implements a storage manager that organizes the storage resources 215 for use by applications, such as the VTL module 320, according to the common store data layout introduced herein. The storage manager can alternatively be implemented by dedicated hardware device. The common store data layout is a structuring of data and metadata on the storage resources 215 that permits reading/writing of the data and that enables the virtual tapes 235 of the VTL system 210 to share the stored data. The VTL module 320 stores data in accordance with the common store data layout. In some embodiments, the storage operating system 315, the VTL module 320, or another application or device (not shown) implements a deduplication technique to eliminate duplicate data stored, or to be stored, on storage resources 215 of the VTL system 210 irrespective of the virtual tape 235 to which the data is written or was originally written.

One or more internal storage devices 325, a storage adapter 330, and a network adapter 335 are also connected to the processor 300 through the interconnect system 310. Internal storage devices 325 may include volatile (e.g., RAM), nonvolatile (e.g., ROM, Flash, etc.), removable, and non-removable computer-readable storage media, or any combination of such media devices that are capable of storing information such as computer-readable instructions, data structures, program modules, or other data. The storage adapter 330 allows the VTL system 210 to access the storage resources 215 of the storage array 220 and may be, for example, a Fibre Channel adapter, a SCSI adapter, or the like. The network adapter 335 provides the VTL system 210 with the ability to communicate with remote devices over a network 230, such as the storage server 205 and/or clients 225, and may be, for example, an Ethernet adapter, a Fibre Channel adapter, or the like.

While VTL systems configured as described above are typically used to support the operation of the facility, those skilled in the art will appreciate that the facility may be implemented using devices of various types and configurations, and having various components.

Figure 4:
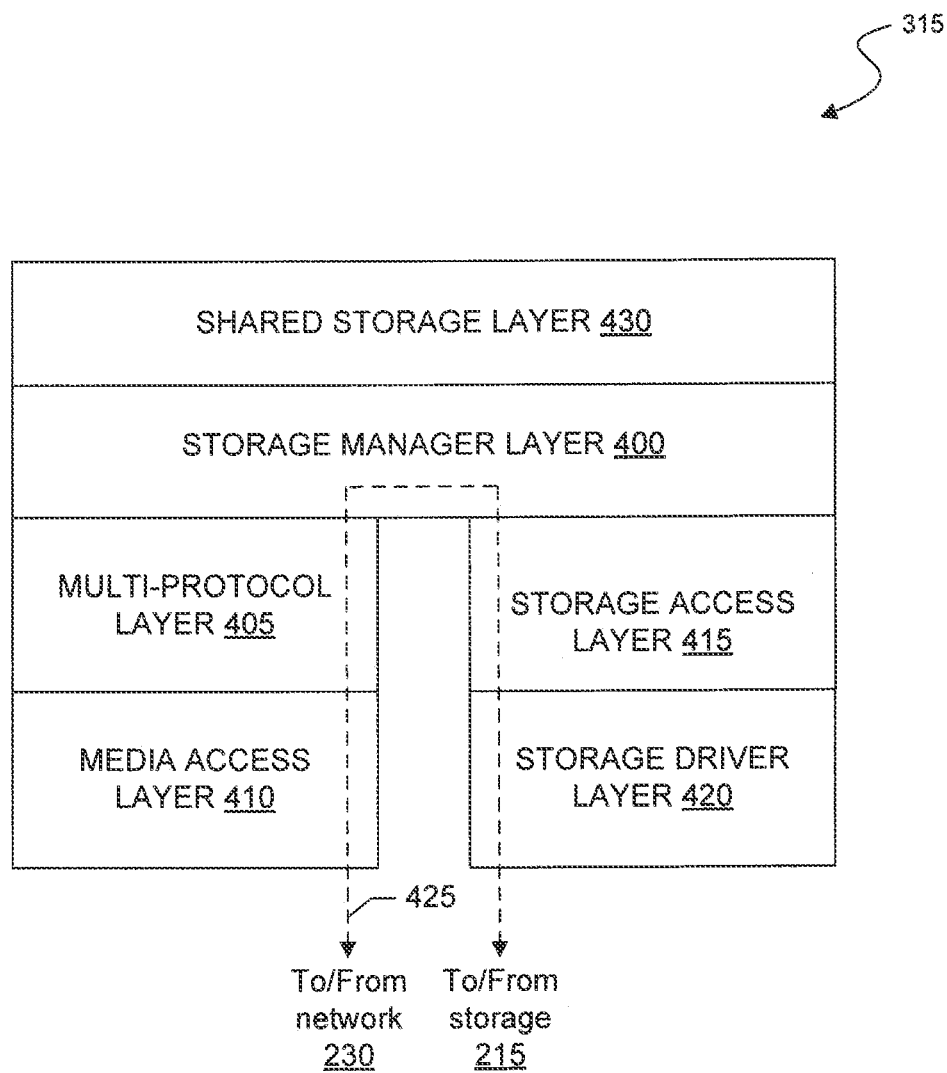
FIG. 4 is a block diagram of a storage operating system of a VTL system.

FIG. 4 shows an example of the architecture of the storage operating system 315 of the VTL system 210. As shown, the storage operating system 315 includes several functional layers. These layers include a storage manager layer 400, which imposes a structure (hierarchy) on data sets written to virtual tapes 235 and stored on the storage resources 215. In some embodiments, the storage manager layer 400 imposes the common store data layout introduced herein on data sets written to virtual tapes 235 and stored on the storage resources 215. The common store data layout is a structuring of data and metadata on the storage resources 215 that enables portions of the storage resources to be allocated to, and shared between, the virtual tapes 235 of the VTL system 210.

Logically "under" the storage manager layer 400, the storage operating system 315 also includes a multi-protocol layer 405 and an associated media access layer 410, to allow the VTL system 210 to communicate over the network 230 (e.g., with storage server 205). The multi-protocol layer 405 implements various higher-level network protocols, such as Network File System (NFS), Common Internet File System (CIFS), Direct Access File System (DAFS), Hypertext Transfer Protocol (HTTP) and/or Transmission Control Protocol/Internet Protocol (TCP/IP). The media access layer 410 includes one or more drivers which implement one or more lower-level protocols to communicate over the network, such as Ethernet, Fibre Channel or Internet small computer system interface (iSCSI).

Also logically "under" the storage manager layer 400, the storage operating system 315 includes a storage access layer 415 and an associated storage driver layer 420, to allow the VTL system 210 to communicate with the storage resources 215 of the storage array 220. The storage access layer 415 implements a higher-level disk storage protocol, such as RAID, while the storage driver layer 420 implements a lower-level storage device access protocol, such as Fibre Channel Protocol (FCP) or small computer system interface (SCSI). Also shown in FIG. 4 is a path 425 of data flow, through the storage operating system 315, associated with a request (e.g., to write a data set to a virtual tape 235).

In some embodiments, the storage operating system 315 includes a shared storage layer 430 logically "above" the storage manager 400. The shared storage layer 430 is an application layer that examines the contents of a data set to determine whether the data set contains duplicate data (i.e., data previously stored on storage resources 215). If duplicate data is identified, the shared storage layer 430 deduplicates the data set before space is allocated on storage resources 215 to store the data set, thereby improving the efficiency of the use of the storage resources 215. In some embodiments, the shared storage layer 430 is included in the storage manager 400. It is noted, however, that the shared storage layer 430 does not have to be implemented by the storage operating system 315 or the VTL system 210. For example, in some embodiments, the shared storage layer 430 is implemented in a separate computer system to which data sets are provided as input, or in the VTL system 210 as a separate component from the storage operating system 315.

Figure 5:
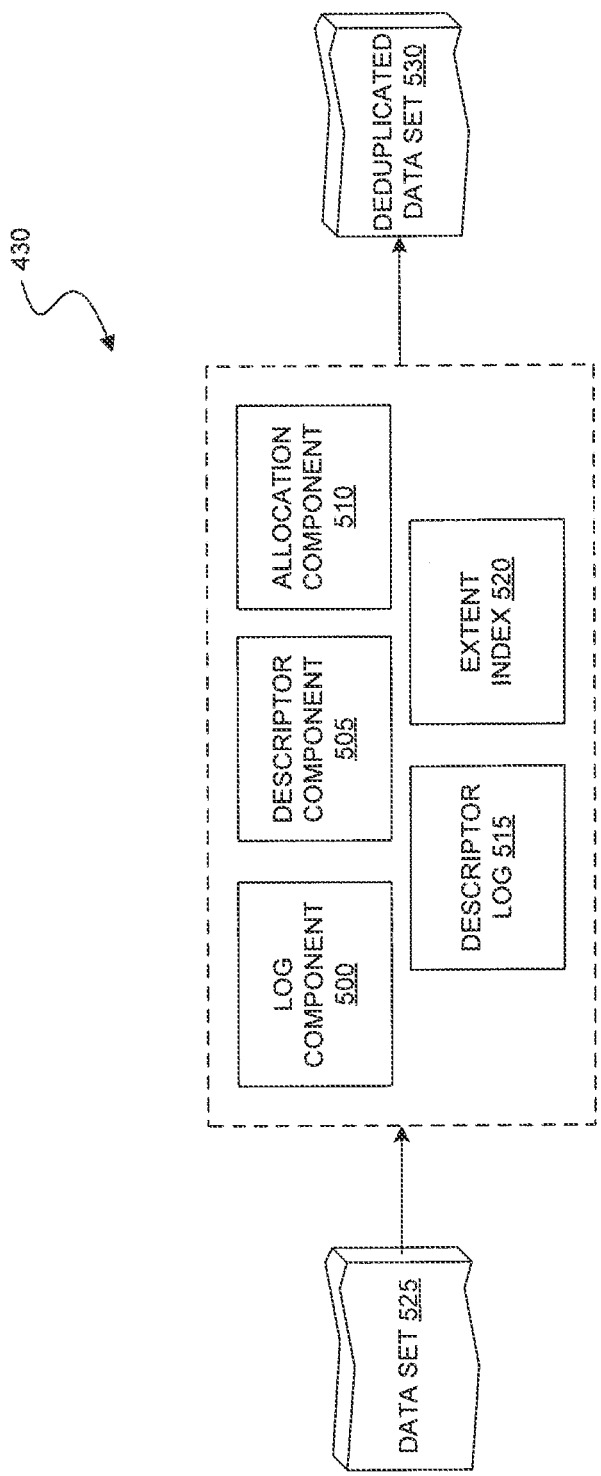
FIG. 5 is a data flow diagram of components that are part of, or interact with, a shared storage layer of a storage operating system.

FIG. 5 is a data flow diagram of components that are part of, or interact with, the shared storage layer 430 of the storage operating system 315. The shared storage layer 430 may be implemented using hardware such as the VTL system 210 illustrated in FIG. 3. The shared storage layer 430 provides functionality to determine whether a received data set includes duplicate data (i.e., data previously stored on the storage resources 215) and to deduplicate the received data set.

As shown in FIG. 5, the shared storage layer 430 includes a log component 500, a descriptor component 505, and an allocation component 510. The log component 500, the descriptor component 505, and the allocation component 510 can each be implemented in hardware or as a combination of hardware and software. The log component 500 maintains one or more data structures that are used to process and deduplicate data sets written to a virtual tape 235 in accordance with the common store data layout introduced herein. In some embodiments, the log component 500 maintains a descriptor log data structure 515 and an extent index data structure 520. The descriptor log data structure 515 includes information about each data set written to a virtual tape 235 and stored on storage resources 215. The actual data of a data set, which is stored on the storage resources 215, is represented by one or more common store extents. The extent index data structure 520 includes information about the common store extents that comprise the data sets identified in the descriptor log data structure 515, such as an indication of whether an extent is shared, a fingerprint (hash value) of the data referenced by the extent, and so on. The descriptor log 515 and extent index 520 data structures may be used together to track the common store units (CSUs) or portions thereof that comprise data allocated to, and shared between, the virtual tapes 235 of the VTL system 210.

The descriptor component 505 receives as input a data set 525 written to a virtual tape 235 of the VTL system 210. The descriptor component 505 processes the received data set 525 to determine whether it includes data previously stored on storage resources 215 (referred to herein as "duplicate data"). In some embodiments, in response to receiving a data set 525, the descriptor component 505 generates a fingerprint (hash value) of each of one or more sections of the received data set. Each section of data is defined by a beginning point and an end point within the received data set 525, and may have a fixed or variable length. For example, sections of a received data set 525 may be identified by partitioning the received data set 525 into a plurality of fixed sized regions. As another example, sections of a received data set 525 may be identified based on anchors within the received data set 525. As used herein, the term "anchor" is used to refer to a point within a data set that defines a region of interest for potential data deduplication. Anchors within a received data set 525 may be identified using various techniques. For example, anchors may be identified at predefined offsets within the received data set 525. The predefined offsets may be fixed or may be based on the type of data within the received data set 525. For example, if the received data set 525 is a tape archival backup data set, an anchor may be placed at the beginning of each file (or block) within the received data set 525. As another example, anchors may be identified by performing a rolling hash, using a fixed size window, along the received data set 525. An anchor may then be identified within the window when the hash value equals a predetermined value. The descriptor component 505 may partition a received data set 525 into sections by comparing (e.g., byte-by-byte) the region surrounding each identified anchor in the received data set 525 with regions known to surround the anchor. The received data set 525 may be partitioned into sections that contain an anchor surrounded by a known region. The remaining portions of the received data set 525 that do not contain an anchor and/or contain an anchor that is not surrounded by a known region may be partitioned into one or more of fixed sized sections.

The descriptor component 505 generates a fingerprint of each section of the received data set 525, for example, by computing a hash value of the corresponding data using a known hashing algorithm, such as SHA-1, SHA-256, SHA-512, or the like. For each generated fingerprint, the descriptor component 505 determines whether the generated fingerprint matches a fingerprint of data previously stored on the storage resources 215. It is noted that each section of data may comprise other sections of data, each having a corresponding fingerprint that may be compared to the fingerprints of previously stored data (e.g., data represented by one or more CSUs or portions thereof, common store extents, etc.). In some embodiments, the descriptor component 505 consults the log component 500 and/or the extent index data structure 520 to determine whether the generated fingerprint matches a fingerprint of data previously stored on storage resources 215. For example, the descriptor component 505 may use the extent index data structure 520 as an index to look up a generated fingerprint.

If a generated fingerprint matches a fingerprint of previously stored data, the descriptor component 505 identifies the section of data as potentially duplicate data. The descriptor component 505 removes the duplicate data from the received data set 525 so that it is not stored on storage resources 215 again, thereby improving the efficiency of the use of the storage resources 215. In some embodiments, this is accomplished by replacing the duplicate data with a storage indicator identifying the previously stored data. For example, the storage indicator may be the fingerprint of the previously stored data, a unique identifier of the common store extent, and/or the like. In some embodiments, prior to removing and/or replacing the section of data, the descriptor component 505 may compare the section of data with the previously stored data to verify that the data is identical. For example, the facility may perform a byte-by-byte comparison of the data. In some embodiments, a common store extent corresponding to the previously stored data is included in the descriptor entry of the received data set 525. The common store extent may be included in the descriptor entry of the data set instead of, or in addition to, replacing the duplicate data with a storage indicator. That is, the descriptor log data structure 515 and/or extent index data structure 520 may be updated to reflect changes in extent sharing by the virtual tape 235 to which the received data set was written.

For those generated fingerprints that do not match a fingerprint of previously stored data, the descriptor component 505 may consult with the allocation component 510 to allocate space on storage resources 215 to store the corresponding sections of data. In some embodiments, a common store extent is allocated for each section of data, while in other embodiments the number of common store extents allocated varies based on the number of data sections within the received data set 525 that are contiguous and/or the size of the sections of data. In some embodiments, the log component 500 generates and stores a fingerprint of the data sections represented by each common store extent that is allocated.

In some embodiments, the allocation component 510 stores sections of the deduplicated data set 530, if any, on the storage resources 215 of the VTL system 210 and/or another storage device. That is, it may not be necessary to store the deduplicated data set 530 on the storage resources 215. For example, if each section of the received data 525 string comprises duplicate data (i.e., data previously stored on storage resources 215), the deduplicated data set 530 need not be stored on storage resources 215. Instead, a descriptor entry is generated for the received data set 525 identifying the common store extents representing the physical locations at which the sections of data are stored on storage resources 215.

In some embodiments, the log component 500, the descriptor component 505, and/or the allocation component 510 are embodied as a combination of hardware and software modules within the shared storage layer 430 of the storage operating system 315. In other embodiments, however, the functionality provided by these components can be implemented, at least in part, by one or more dedicated hardware circuits. One or more of the components and/or data structures illustrated in FIG. 5 may be stored or distributed on, for example, computer-readable media, including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the facility may be distributed over the Internet or over other networks (including wireless networks), on a propagated signal on a propagation medium (e.g., an electromagnetic wave(s), etc.) over a period of time, or they may be provided on any analog or digital network (packet switched, circuit switched, or other scheme).

Figure 7A:
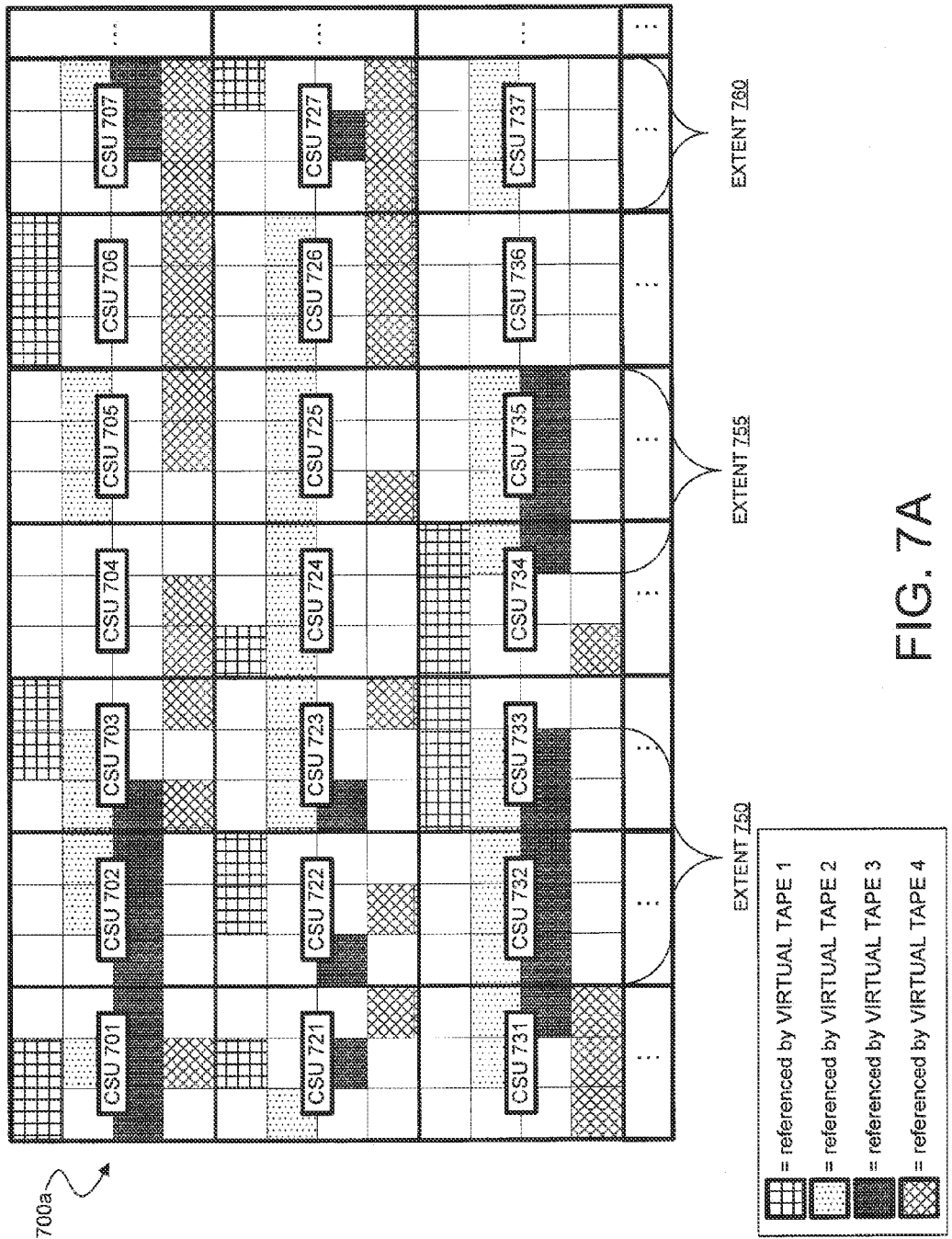
FIGS. 7A and 7B show example representations of physical storage resources consumed by virtual tapes of a VTL system at the first and second points in time illustrated in FIGS. 6A and 6B, respectively.
Figure 7B:
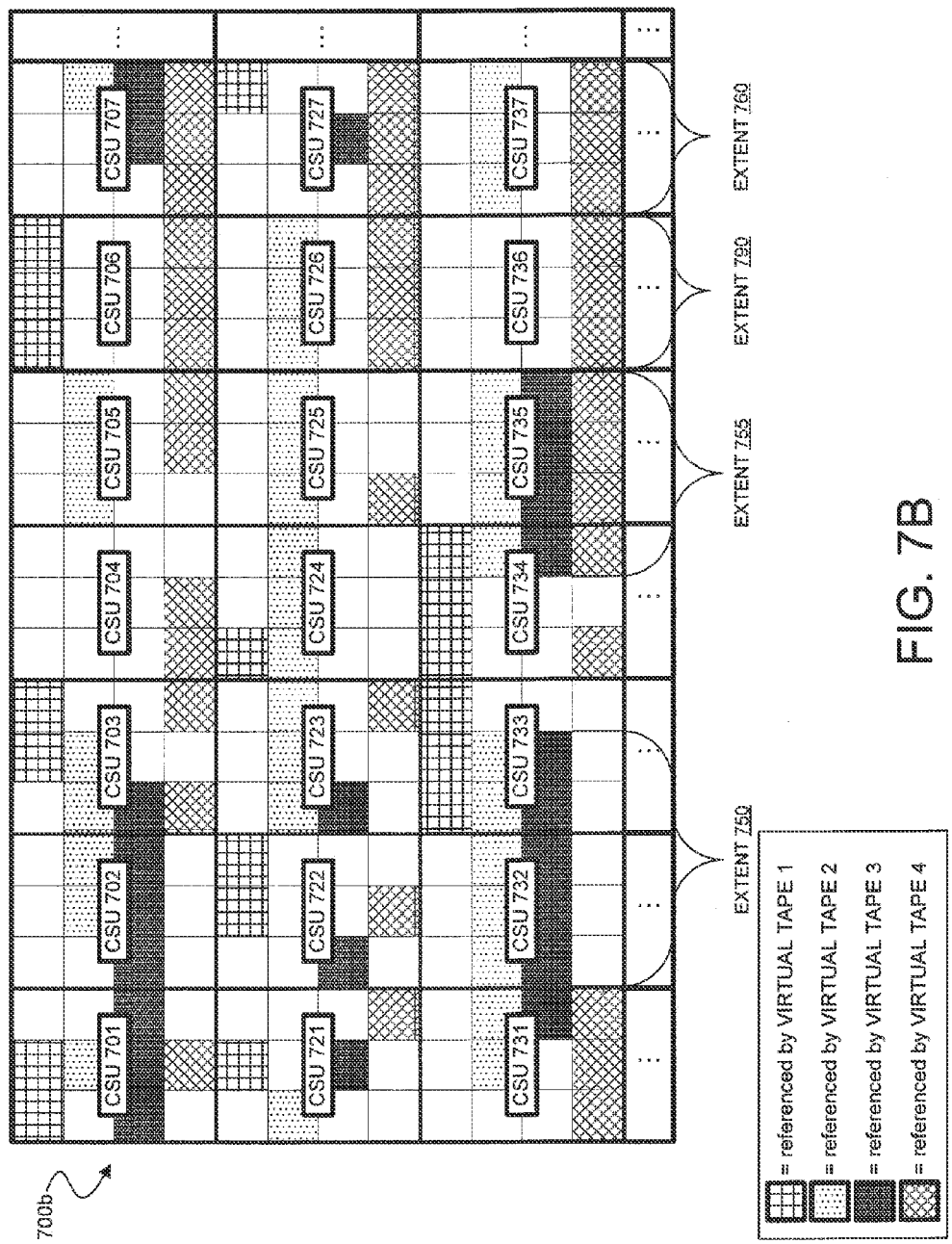

By enabling the virtual tapes 235 of the VTL system 210 to share data stored on storage resources 215, the shared storage layer 430 reduces the storage of duplicate data, thereby improving the efficiency of the use of the storage resources 215. To facilitate description, the descriptor log data structure 515 and the extent index data structure 520 are illustrated by example in FIGS. 6A and 6B at two different points in time. FIG. 6A illustrates the descriptor log data structure 515 and the extent index data structure 520 at a first (earlier) point in time, while FIG. 6B illustrates the descriptor log data structure 515 and the extent index data structure 520 at a second (later) point in time. To further facilitate description, FIGS. 7A and 7B are examples of representations of the physical storage resources 215 consumed by the virtual tapes 235 of a VTL system 210 at the same points in time illustrated in FIGS. 6A and 6B, respectively. The representations (referred to as "common data store maps") illustrated in FIGS. 7A and 7B identify, at each point in time, the CSUs and/or portions thereof comprising data allocated to, and shared between, the virtual tapes 235 of the VTL system 210.

The data structures illustrated in FIGS. 6A-6B and 7A-7B are shown as tables whose contents and organization are designed to make the data structures more comprehensible by a human reader. Those skilled in the art will appreciate that the data structures may differ from the tables shown, and that the values shown are only examples used to facilitate description. For example, the data structures may be organized in a different manner; may contain more or less information than shown; may be compressed and/or encrypted; and so on. Similarly, those skilled in the art will appreciate that the data structures illustrated in FIGS. 6A-6B and 7A-7B can be considerably more complex than the data structures shown.

As shown in FIG. 6A, the descriptor log 515a includes a plurality of descriptor entries 600a-600n, each corresponding to a data set written to a virtual tape 235 of the VTL system and stored on storage resources 215. For example, the descriptor log 515a may represent a number of redundant data sets (e.g., backups of a volume of data maintained by storage server 205, such as a file system) written to different virtual tapes. Each descriptor entry 600 is divided into fields which contain information about a corresponding data set. A data set identifier (ID) field 601 is used as a unique identifier for the corresponding data set. A virtual tape ID field 602 is used to identify the virtual tape to which the corresponding data set was written. A size field 603 is used to identify the uncompressed length of the corresponding data set. A common store extents field 604 is used to identify the common store extents comprising the corresponding data set. The common store extents field 604 of a descriptor entry 600 may contain one or more extent identifiers. The extent identifiers may be provided in an order representing the logical position of corresponding sections of data within the data set. Those skilled in the art will appreciate that a descriptor entry may include other information not specifically illustrated.

The extent index 520a illustrated in FIG. 6A includes a plurality of extent entries 605a-605x, each corresponding to a common store extent that comprises a data set or section thereof identified in the descriptor log 515a. Each extent entry 605 is divided into fields which contain information about the corresponding common store extent. An extent ID field 606 is used as a unique identifier for the corresponding extent. A common store unit (CSU) ID field 607 is used to identify the CSU in which the corresponding extent begins. A offset field 608 is used to identify an address corresponding to the record compression unit (RCU) of the CSU in which the corresponding extent begins. A size field 609 is used to identify the uncompressed length of the corresponding extent. A deduped field 610 is used to identify whether the corresponding extent is shared by two or more data sets. A fingerprint field 611 includes a fingerprint (hash value) of the data represented by the corresponding extent computed, for example, using a known hashing algorithm, such as SHA-1, SHA-256, SHA-512, or the like. Each common store extent represents a physical location at which a section of data is stored on storage resources 215. For example, a common store extent may be referenced by an offset 608 in a CSU 607 (e.g., an address corresponding to a record compression unit (RCU) of the CSU in which the extent begins) and an uncompressed length 609 of the extent. A common store extent referencing a section of a first data set written to a virtual tape 235 may be included in a descriptor entry 600 of another data set written to another virtual tapes 235. For example, as illustrated in FIG. 6A, the data sets corresponding to descriptor entries 600a and 600b were written to different virtual tapes 235 (virtual tapes 2 and 3); however, each data set includes data represented by common store extents 750 and 755.

FIG. 7A illustrates a representation (referred to as common store descriptor map 700a) of the physical storage resources 215 that are allocated to, and shared between, four virtual tapes 235 of the VTL system 210 at the same point in time illustrated in FIG. 6A. It is noted that an actual common store descriptor map is likely to be considerably more complex than common store descriptor map 700a.

Also, for simplicity, the underlying items of data and associated metadata are not shown.

In the illustrated embodiment, the common store data map 700a includes common store units (CSUs) 701-737, some of which store data written to one or more of the virtual tapes 235. To facilitate description, each CSU is illustrated as comprising three columns and four rows. Each column is used to represent a portion of the data comprising the CSU, while each row is used to indicate whether a virtual tape references the CSU or any portion thereof. A virtual tape 235 "references" a CSU when the CSU stores data written to the virtual tape 235. As shown, a CSU can be referenced (shared) by one or more virtual tapes 235. For example, CSU 737 is referenced by virtual tape 2, while CSU 732 is referenced by virtual tape 2 and virtual tape 3. All or a portion of a CSU may be fully referenced (shared) by any number of tapes. For example, CSU 706 is fully referenced by virtual tape 1 and virtual tape 4, thereby conserving the storage resources 215. As another example, CSU 731 is fully referenced by virtual tape 4 and partially referenced by virtual tape 2 and virtual tape 3. Typically, a data set spans multiple common store extents and each common store extent spans one or more contiguous common store units (CSUs). For example, the data set corresponding to descriptor entry 600a spans common store extents 750 and 755, which span all or a portion of CSUs 732-735 (illustrated in FIG. 7A). The common store extents of a data set may or may not be allocated contiguously on storage resources 215. For example, as illustrated in FIG. 7A, common store extents 750 and 755 are not allocated contiguously on storage. For simplicity, only the extents corresponding to descriptor entries 600a and 600b are illustrated in FIG. 7A.

As illustrated in FIGS. 6B and 7B, a new data set (represented by descriptor entry 600m) written at a second (later) point in time includes significant amounts of duplicate data previously written to other virtual tapes 235 and stored on storage resources 215 (represented by common store extents 755 and 760). In response to receiving the new data set, a descriptor entry 600m is created. In the illustrated example, the new data set includes new data and duplicate data (i.e., data previously stored on storage resources 215 as represented by common store extents 755 and 760). Space is allocated on storage resources 215 to store the new data (common store extent 790) and an extent entry 605y is created. However, no space is allocated to store the previously stored data. Instead, the extent identifiers 606 of the previously stored data are included in the descriptor entry 600m of the new data set. As a result, as illustrated in FIG. 7A, the data represented by common store extent 755 is shared by data sets written to virtual tapes 2-4 and the data represented by common store extent 760 is shared by data sets written to virtual tapes 2 and 4.

Figure 8:
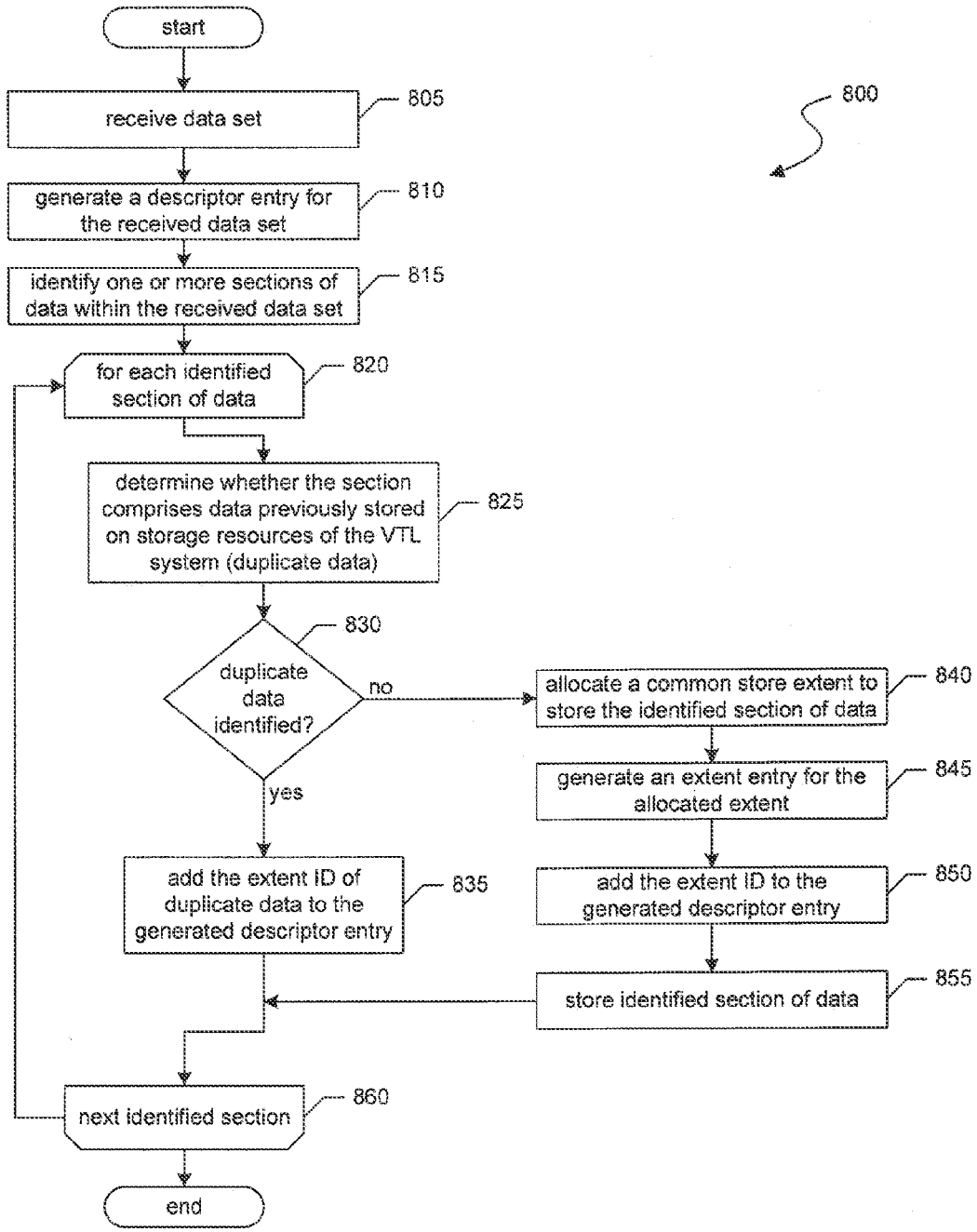
FIG. 8 is a flow chart of a process that may be performed by the facility to eliminate duplicate data by sharing common store extents across virtual tapes of a VTL system.

By implementing the common store data layout introduced herein on storage resources 215 of the VTL system 210, data stored on the storage resources 215 may be shared across multiple virtual tapes 235, thereby eliminating duplicated data on the storage resources 215 and improving the efficiency of the use of the storage resources 215. FIG. 8 is a flow chart of a process 800 performed by the facility to reduce duplicate data by sharing common store extents across virtual tapes 235 of the VTL system. In some embodiments, the process 800 is performed by the shared storage layer 430 of the storage operating system 315.

In step 805, the facility receives a data set 525 written to a virtual tape 235 of the VTL system 210. The received data set 525 may include one or more sections of data previously written to another virtual tape 235 and stored on storage resources 215. In step 810, the facility generates a descriptor entry 600 corresponding to the received data set 525. The descriptor entry 600 may include a unique identifier 601 assigned to the received data set, a virtual tape identifier 602 identifying the virtual tape to which the received data set was written, and a size 603 of the received data set (e.g., the uncompressed length in bytes).

In step 815, the facility identifies one or more sections of data within the received data set 525. Each section of data is defined by a beginning point and an end point within the received data set 525, and may have a fixed or variable length. For example, sections of a received data set 525 may be identified based on anchors within the received data set 525. The facility loops through steps 820-860 for each identified section of data. It is noted that some sections of data may comprise other sections of data. In some embodiments, the shared storage layer 430 may only loop through steps 820-860 for sections of data contained in a first identified section if the first identified section does not comprise duplicate data (i.e., data previously stored on storage resources 215).

In step 820, the facility selects an identified section of the received data set 525 for processing. In step 825, the facility determines whether the selected section comprises duplicate data (i.e., data previously stored on storage resources 215 of the VTL system 210. For example, the facility may generate a fingerprint of the selected section of data and compare the generated fingerprint to fingerprints 611 of previously stored data.

In step 830, if the selected section comprises duplicate data, then the facility continues to step 835. Otherwise, if the selected section comprises duplicate data, then the facility continues to step 840. In step 835, the facility adds the extent identifier 606 of the duplicate data to the generated descriptor entry 600. For example, the facility may use the extent index data structure 520 to lookup an extent identifier 606 corresponding to a fingerprint that matches the fingerprint generated from the selected section of data. The extent identifier 606 may be included in the common store extents field 604 of the descriptor entry 606. The facility continues to step 860 as described further herein.

In step 840, the facility allocates a common store extent on the storage resources 215 to store the selected section of data. In step 845, the facility generates an extent entry 605 corresponding to the allocated common store extent. The extent entry 605 comprises a unique extent identifier 606, a CSU identifier 607 identifying the CSU in which the extent begins, an offset 608 identifying a record compression unit (RCU) of the CSU in which the extent begins, a size 609 of the extent (e.g., uncompressed length), an indication 610 of whether the extent is shared (typically an extent is not shared when it is first allocated), and a fingerprint 611 of the data represented by the extent. In step 850, the facility adds the unique extent identifier 606 of the allocated extent to the generated descriptor entry 600 of the received data set. For example, the extent identifier 606 may be included in the common store extents field 604 of the descriptor entry 606. In step 855, the facility stores the section of data to storage resource 215. In step 860, if any identified section remain, the facility continues to step 820 to select the next identified section. Otherwise, the process 800 ends.

Those skilled in the art will appreciate that the steps shown in FIG. 8 may be altered in a variety of ways. For example, the order of certain steps may be rearranged; certain sub-steps may be performed in parallel; certain shown steps may be omitted; or other steps may be included; and so on.

Thus, a facility that enables emulated storage devices to share data stored on physical storage devices has been described. By enabling emulated storage devices, such as virtual tapes of a VTL system, to share data stored on physical storage devices, the facility enables deduplication across emulated storage devices, thereby eliminating duplicate data and improving the physical storage consumption of the emulated storage devices. Although the invention has been described with reference to specific embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

We claim:

1. A physical storage device comprising:
   a first data set written to a first emulated storage device, wherein the first data set includes a first section of data; and
   a second data set written to a second emulated storage device, wherein the second data set includes the first section of data, and wherein the first section of data is written to a storage location on the physical storage device that is shared by the first and second emulated storage devices,
   wherein the physical storage device is organized according to a common store data layout, and wherein the storage location corresponds to a portion of a common store extent, said common store extend including a plurality of common store units.

2. The physical storage device of claim 1 wherein the common store extent is referenced by an offset in a common store unit, an uncompressed length of the common store extent, and a number of common store units included in the common store extent.

3. The physical storage device of claim 1 wherein each of the plurality of common store units includes a fixed number of contiguous data blocks.

4. The physical storage device of claim 1 wherein each of the plurality of common store units includes a variable number of contiguous data blocks.

5. The physical storage device of claim 1 wherein each of the plurality of common store units includes a header, one or more record compression units of compressed data, and boundary information mapping the beginning of each record compression unit to an offset in compressed storage of the physical storage device.

6. The physical storage device of claim 1 wherein the emulated storage devices are virtual tapes of a virtual tape library.

7. The physical storage device of claim 1 wherein a deduplication technique is applied to the physical storage device to eliminate duplicate data stored thereon irrespective of the emulated storage device to which the duplicate data was originally written.

8. A physical storage device comprising:
   a first data set written to a first emulated storage device, wherein the first data set includes a first section of data; and
   a second data set written to a second emulated storage device, wherein the second data set includes the first section of data, and wherein the first section of data is written to a storage location on the physical storage device that is shared by the first and second emulated storage devices,
   wherein the physical storage device is organized according to a common store data layout, and wherein the storage location corresponds to a portion of a common store extent that is referenced in whole by the first emulated storage device, and referenced in part by the second emulated storage device.

9. The physical storage device of claim 8, wherein the emulated storage devices are virtual tapes of a virtual tape library.

10. The physical storage device of claim 8, wherein a deduplication technique is applied to the physical storage device to eliminate duplicate data stored thereon irrespective of the emulated storage device to which the duplicate data was originally written.

11. One or more computer-readable memories storing computer-executable instructions for implementing a method for deduplication at a storage server, comprising:
   instructions for storing a first data set at a first emulated storage device, wherein the first data set includes a first section of data; and
   instructions for storing a second data set at a second emulated storage device, wherein the second data set includes the first section of data, and wherein the first section of data is stored at a storage location on the physical storage device that is shared by the first and second emulated storage devices,
   wherein the physical storage device is organized according to a common store data layout, and wherein the storage location corresponds to a portion of a common store extent, the common store extent including a plurality of common store units.

12. The one or more computer-readable memories of claim 11, wherein each of the plurality of common store units includes a header, one or more record compression units of compressed data, and boundary information mapping the beginning of each record compression unit to an offset in compressed storage of the physical storage device.

13. The one or more computer-readable memories of claim 11, wherein the common store extent is referenced by an offset in a common store unit, an uncompressed length of the common store extent, and a number of common store units included in the common store extent.

14. The one or more computer-readable memories of claim 11, further comprising:
   instructions for applying a deduplication technique to the physical storage device to eliminate duplicate data stored thereon irrespective of the emulated storage device to which the duplicate data was originally written.

15. One or more computer-readable memories storing computer-executable instructions for implementing a method for deduplication at a storage server, comprising:
   instructions for storing a first data set at a first emulated storage device, wherein the first data set includes a first section of data; and
   instructions for storing a second data set at a second emulated storage device, wherein the second data set includes the first section of data, and wherein the first section of data is stored at a storage location on the physical storage device that is shared by the first and second emulated storage devices,
   wherein the physical storage device is organized according to a common store data layout, and wherein the storage location corresponds to a portion of a common store extent that is referenced in whole by the first emulated storage device, and referenced in part by the second emulated storage device.

* * * * *